(12) United States Patent
Jang et al.

(10) Patent No.: US 11,627,301 B2
(45) Date of Patent: Apr. 11, 2023

(54) IMAGE SENSOR AND CAMERA MODULE USING SAME

(71) Applicant: LG INNOTEK CO., LTD., Seoul (KR)

(72) Inventors: Seong Ha Jang, Seoul (KR); Woong Lee, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/254,030

(22) PCT Filed: Jun. 20, 2019

(86) PCT No.: PCT/KR2019/007445
§ 371 (c)(1),
(2) Date: Dec. 18, 2020

(87) PCT Pub. No.: WO2019/245300
PCT Pub. Date: Dec. 26, 2019

(65) Prior Publication Data
US 2021/0266519 A1    Aug. 26, 2021

(30) Foreign Application Priority Data

Jun. 20, 2018  (KR) .................. 10-2018-0071029

(51) Int. Cl.
*H04N 13/271* (2018.01)
*G06T 3/40* (2006.01)
*H04N 5/225* (2006.01)

(52) U.S. Cl.
CPC ......... *H04N 13/271* (2018.05); *G06T 3/4076* (2013.01); *H04N 5/2256* (2013.01)

(58) Field of Classification Search
None
See application file for complete search history.

(56) References Cited

U.S. PATENT DOCUMENTS 10,237,534 B2 *   3/2019  Offenberg ............ H04N 13/204
10,996,320 B2 *   5/2021  Aoki ....................... G01S 17/32
(Continued)

FOREIGN PATENT DOCUMENTS

CN    104040370 A    9/2014
CN    105009291 A    10/2015
(Continued)

*Primary Examiner* — Shadan E Haghani
(74) *Attorney, Agent, or Firm* — Birch, Stewart, Kolasch & Birch, LLP

(57) ABSTRACT

An image sensor according to an embodiment of the present invention includes: a pixel array in which a plurality of pixels are arrayed in a grid shape, and which converts reflection light signals reflected from an object into electrical signals; an image processor which converts the electrical signals to generate subframes, and extracts pieces of second depth information having a higher resolution than pieces of first depth information extracted from a plurality of the subframes; and a memory for storing the pieces of first depth information, wherein the reflection light signals are input to the pixel array through mutually different optical paths shifted in sub-pixel units of the pixel array, and the memory stores a plurality of the pieces of first depth information that correspond to the mutually different optical paths.

15 Claims, 7 Drawing Sheets

(a)

(b)

(56) References Cited

U.S. PATENT DOCUMENTS

| | | | |
|---|---|---|---|
| 2007/0064976 A1* | 3/2007 | England, III | G01C 3/08 |
| | | | 382/106 |
| 2011/0037969 A1* | 2/2011 | Spickermann | G01S 7/4863 |
| | | | 356/5.01 |
| 2014/0002683 A1* | 1/2014 | Muraki | H04N 5/247 |
| | | | 348/211.11 |
| 2014/0098192 A1 | 4/2014 | Park et al. | |
| 2014/0211056 A1 | 7/2014 | Fan | |
| 2015/0002664 A1 | 1/2015 | Eppinger et al. | |
| 2018/0011285 A1 | 1/2018 | Aschwanden et al. | |

FOREIGN PATENT DOCUMENTS

| | | | |
|---|---|---|---|
| CN | 106104302 A | * | 11/2016 |
| CN | 106412388 A | | 2/2017 |
| JP | 03072664 A | * | 3/1991 |
| JP | 2004120403 A | * | 4/2004 |
| KR | 10-2014-0046335 A | | 4/2014 |
| KR | 10-1629610 B1 | | 6/2016 |
| KR | 10-2017-0033909 A | | 3/2017 |

\* cited by examiner

IMAGE SENSOR AND CAMERA MODULE USING SAME

CROSS REFERENCE TO RELATED APPLICATIONS

This application is the National Phase of PCT International Application No. PCT/KR2019/007445, filed on Jun. 20, 2019, which claims priority under 35 U.S.C. 119(a) to Patent Application No. 10-2018-0071029, filed in the Republic of Korea on Jun. 20, 2018, all of which are hereby expressly incorporated by reference into the present application.

TECHNICAL FIELD

The present invention relates to an image sensor and a camera module using the same.

BACKGROUND ART

Three-dimensional contents are applied to various fields such as education, manufacturing, automatic driving, and the like in addition to the fields of game and culture, and in order to obtain the three-dimensional contents, a depth map is required. The depth map is a map showing a spatial distance and shows perspective information of one point with respect to another point in a two-dimensional image.

One of methods of obtaining a depth map is to project infrared (IR) structured light on an object and interpret reflected light from the object to extract a depth map. With the IR structured light, there is a problem in that it is difficult to obtain a desired level of depth resolution of a moving object.

Meanwhile, a time of flight (ToF) method is drawing attention as a technology replacing the IR structured light method.

According to the ToF method, a flying time, that is, a time for which light is emitted, reflected, and returned, is measured to calculate a distance to an object. A big advantage of the ToF method is to quickly provide information of a distance in a three-dimensional space in real time. In addition, a user may obtain accurate distance information without applying an additional algorithm or correcting hardware-wise. In addition, even when a very close subject or a moving subject is measured, an accurate depth map may be obtained.

However, in the case of the current ToF method, there is a problem in that information, which can be obtained from one frame, is insufficient, that is, the resolution thereof is very low.

As a method of improving a resolution, there is a method of increasing the number of pixels of an image sensor. However, in this case, there are problems in that a volume and a manufacturing cost of a camera module are seriously increased.

Accordingly, a method of obtaining a depth map is required which allows the resolution to be improved without seriously increasing the volume and the manufacturing cost of the camera module.

Technical Problem

The present invention is directed to providing an image sensor configured to extract a depth map using a time of flight (ToF) method and a camera module including the same.

Technical Solution

One aspect of the present invention provides an image sensor including a pixel array in which a plurality of pixels are arrayed in a grid shape and which converts reflection light signals reflected by an object to electrical signals, an image processor configured to convert the electrical signals to generate subframes and extract a second depth map with a resolution higher than a resolution of first depth maps extracted from the plurality of subframes, and a memory configured to store the first depth maps, wherein the reflection light signals are input into the pixel array through different optical paths shifted in units of subpixels of the pixel array, and the memory stores the plurality of first depth maps corresponding to the different optical paths.

The image processor may include a converter unit configured to convert the electrical signals received from the pixel array to generate the subframes and configured to apply depth calculation to the subframes to extract the first depth maps, a super resolution (SR) processing unit configured to extract the second depth map using the plurality of first depth maps stored in the memory, an output unit configured to output the second depth map, and a control unit configured to control input and output of the first and second depth maps.

When the memory stores the first depth maps, the control unit may control the plurality of first depth maps stored in the memory to be transmitted to the SR processing unit.

When the SR processing unit receives the plurality of first depth maps stored in the memory, the SR processing unit may extract the second depth map by applying an SR technology to the received plurality of subframes.

When the memory receives the first depth maps from the image processor, the memory may delete, among first depth maps prestored therein, a first depth map corresponding to an optical path which is the same as the optical path of the first depth map received from the image processor, and store the first depth maps received from the image processor.

Each of the pixel array, the image processor, and the memory may be formed as a layer type, and the memory may be stacked between the pixel array and the image processor.

Each of the pixel array and the image processor may be formed as a layer type, the pixel array may be stacked on the image processor, and the memory may be included in the layer in which the image processor is formed.

The number of optical paths shifted in units of subpixels of the pixel array may be N×M, wherein N and M are integers greater than zero, and the memory may store the N×M first depth maps.

The subpixel may have a size greater than a size of zero pixels and less than a size of one pixel.

Another aspect of the present invention provides a camera module including a lighting part configured to output an incident light signal to be emitted to an object, a lens part configured to collect reflection light signals reflected by the object, an image sensor part configured to extract a depth map using the reflection light signals collected by the lens part, and a tilting part configured to shift at least one optical path of the incident light signal or the reflection light signals in units of subpixels of the image sensor part for each image frame, wherein the image sensor part includes a pixel array in which a plurality of pixels are arrayed in a grid shape and which converts the reflection light signals reflected by the object to electrical signals, an image processor configured to convert the electrical signals to generate subframes and extract a depth map with a resolution higher than a resolution of the subframes using the plurality of subframes, and a memory configured to store the subframes, the reflection light signals are input into the pixel array through different optical paths shifted in units of subpixels of the pixel array, and the memory stores the plurality of subframes corresponding to the different optical paths.

When the memory stores the first depth maps, the image processor may control the plurality of first depth maps stored in the memory to be transmitted to the supper resolution (SR) processing unit.

When the image processor receives the plurality of first depth maps stored in the memory, the image processor may extract the second depth map by applying an SR technology to the received plurality of subframes.

When the memory receives first depth maps from the image processor, the memory may delete, among first depth maps prestored therein, a first depth map corresponding to an optical path which is the same as an optical path of the first depth map received from the image processor, and stores the first depth map received from the image processor.

Advantageous Effects

When a camera module according to embodiments of the present invention is used, a depth map with a high resolution can be obtained even without increasing the number of pixels in an image sensor.

In addition, when the camera module according to the embodiments of the present invention is used, since the image sensor processes signals and outputs the depth map, a volume and a weight of the camera module can be decreased, and a signal transmission time can also be decreased to reduce a signal processing time.

MODES OF THE INVENTION

Since the present invention allows for various changes and numerous embodiments, specific embodiments will be illustrated in the accompanying drawings and described in detail in the written description. However, this is not intended to limit the present invention to specific embodiments, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. The term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, it will be understood that there are no intervening elements.

The terminology used herein is for the purpose of describing particular embodiments only and is not intended to be limiting to the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, the numbers, steps, operations, elements, components, and/or groups thereof but do not preclude the presence or addition of one or more other features, the numbers, steps, operations, elements, components, and/or groups thereof.

Unless otherwise defined, all terms (including technical and scientific terms) used herein have the same meaning as commonly understood by those skilled in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Example embodiments of the invention will be described below in detail with reference to the accompanying drawings. Components that are the same or correspond to each other are denoted by the same reference numeral regardless of the figure number, and redundant description will be omitted.

Then, a camera module according to an embodiment of the present invention will be described in detail with reference to FIGS. 1 to 4. The camera module according to the embodiment of the present invention may be a time of flight (ToF) camera module for extracting a depth image including information of distances from an object, that is, a depth map.

Figure 1:
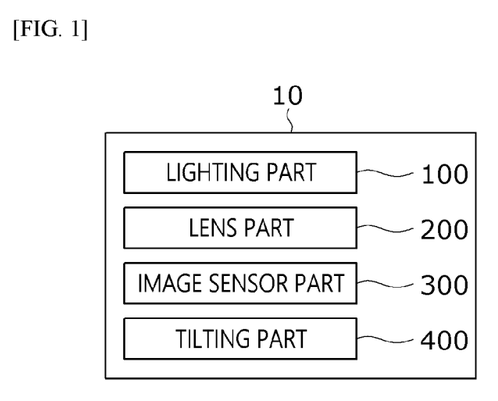
FIG. 1 is a block diagram of a camera module according to an embodiment of the present invention.

FIG. 1 is a block diagram of the camera module according to the embodiment of the present invention.

As illustrated in FIG. 1, a camera module 10 according to the embodiment of the present invention includes a lighting part 100, a lens part 200, an image sensor part 300, and a tilting part 400.

The lighting part 100 generates an incident light signal and emits the incident light signal to an object. In this case, the lighting part 100 may generate and output the incident light signal in a shape of a pulse or continuous wave. The continuous wave may have a shape of a sinusoid or squared wave. Since the incident light signal is generated in the shape of the pulse or continuous wave, the camera module 10 may detect a phase difference between the incident light signal output from the lighting part 100 and a reflection light signal reflected from the object. In the present specification, incident light may mean light which is output from the lighting part 100 and is incident on the object, and reflection light may mean light which is output from the lighting part 100, reaches the object, and is reflected by the object. The incident light may be output light from a viewpoint of the camera module 10 and the refection light may be input light therefrom.

The lighting part 100 emits the generated incident light signal to the object for a predetermined integration time. In this case, the integration time means one frame cycle. In a case in which a plurality of frames are generated, a set integration time is repeated. For example, in a case in which the ToF camera module 10 captures images of an object at 20 FPS, the integration time is 1/20 [sec]. In addition, in a case in which 100 frames are generated, the integration time may be repeated 100 times.

The lighting part 100 may generate a plurality of incident light signals having different frequencies. The lighting part 100 may sequentially and repeatedly generate a plurality of incident light signals having different frequencies. Alternatively, the lighting part 100 may also simultaneously generate a plurality of incident light signals having different frequencies.

Figure 2:
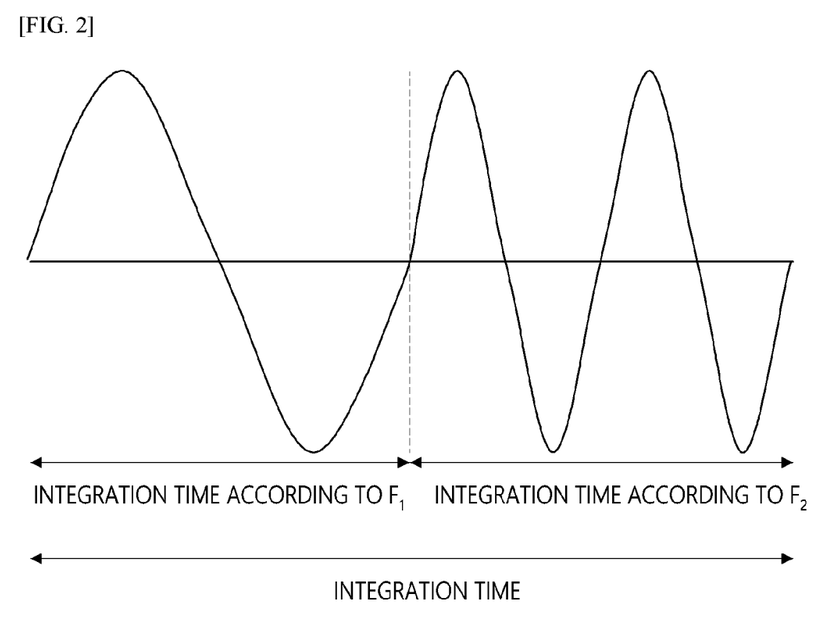
FIG. 2 is a view for describing a frequency of an incident light signal.

FIG. 2 is a view for describing a frequency of an incident light signal. According to the embodiment of the present invention, as illustrated in FIG. 2, the lighting part 100 may be controlled to generate an incident light signal with a frequency f1 for a first half of an integration time and generate an incident light signal with a frequency f2 for the remaining half of the integration time.

According to another embodiment, a lighting part 100 may control some light emitting diodes (LEDs) among a plurality of LEDs to generate incident light signals with a frequency f1 and control the remaining LEDs to generate incident light signals with a frequency f2.

To this end, the lighting part 100 may include a light source configured to generate light and a light modulator configured to modulate the light.

First, the light source generates light. The light generated by the light source may be infrared light with a wavelength of 770 to 3000 nm and may also be visible light with a wavelength of 380 to 770 nm. LEDs may be used to form the light source, and the light source may have a shape in which the plurality of LEDs may be arrayed in a predetermined pattern. In addition, the light source may also include organic LEDs (OLEDs) or laser diodes (LDs).

The light source is repeatedly turned on and off at predetermined time intervals to generate an incident light signal having a shape of a pulse or continuous wave. The predetermined time interval may be a frequency of the incident light signal. Turning on and off of the light source may be controlled by the light modulator.

The light modulator controls the turning on and off of the light source to control the light source to generate the incident light signal in the shape of the continuous or pulse wave. The light modulator may control the light source to generate the incident light signal having the shape of the continuous or pulse wave through frequency modulation, pulse modulation, or the like.

Meanwhile, the lens part 200 collects a light signal reflected by the object and transmits the reflection light signal to the image sensor part 300.

Figure 3:
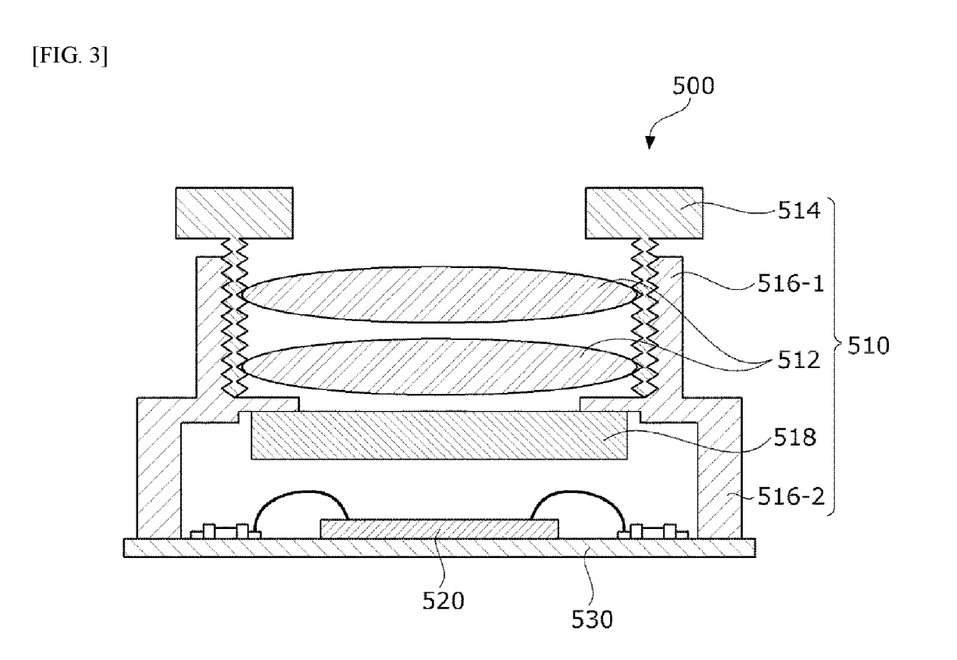
FIG. 3 is a cross-sectional view illustrating an example of the camera module.

FIG. 3 is a cross-sectional view illustrating an example of the camera module.

Referring to FIG. 3, a camera module 500 includes a lens assembly 510, a pixel array 520, and a printed circuit board 530. In this case, the lens assembly 510 may correspond to the lens part 200 of FIG. 1, and the pixel array 520 and the printed circuit board 530 may correspond to the image sensor part 300 of FIG. 1. Although not illustrated in the drawing, the lighting part 100 of FIG. 1 may be disposed on a side surface of an image sensor on the printed circuit board 530 or may also be disposed outside the camera module 500.

The lens assembly 510 may include lens 512, a lens barrel 514, a lens holder 516, and an infrared (IR) filter 518.

The lens 512 may be provided as a plurality of lenses 512 and may also be provided as one lens 512. In the case in which the lens 512 is provided as the plurality of lenses 512, the lenses may be aligned with respect to a central axis to form an optical system. In this case, the central axis may be the same as an optical axis of the optical system.

The lens barrel 514 may be coupled to the lens holder 516, and a space for accommodating the lens may be provided therein. The lens barrel 514 may be coupled to one of the plurality of lenses by rotation but is exemplary, and the lens barrel 514 may be coupled thereto through a different method such as a method using an adhesive (for example, an adhesive resin such as an epoxy).

The lens holder 516 may be coupled to and support the lens barrel 514 and coupled to the printed circuit board 530 on which the pixel array 520 is mounted. Due to the lens holder 516, a space in which the IR filter 518 may be attached may be formed under the lens barrel 514. A spiral pattern may be formed on an inner circumferential surface of the lens holder 516, and the lens holder 516 may be coupled by rotation to the lens barrel 514 on which a spiral pattern is formed on an outer circumferential surface thereof as on the lens holder 516. However, this is exemplary, and the lens holder 516 and the lens barrel 514 may be coupled by an adhesive, or the lens holder 516 and the lens barrel 514 may also be integrally formed.

The lens holder 516 may be divided into an upper holder 516-1 coupled to the lens barrel 514 and a lower holder 516-2 coupled to the printed circuit board 530 on which the pixel array 520 is mounted. The upper holder 516-1 and the lower holder 516-2 may be integrally formed, separately formed and fastened or coupled, or separately formed and spaced apart from each other. In this case, the upper holder 516-1 may be formed to have a diameter less than a diameter of the lower holder 516-2.

The example is only one embodiment, and the lens part 200 may also be provided as a different structure which may collect a reflection light signal incident on the camera module 10 and transmit the reflection light signal to the image sensor part 300.

Referring to FIG. 1 again, the image sensor part 300 extracts a depth map using reflection light signals collected through the lens part 200. After the image sensor part 300 converts the reflection light signals reflected by an object to electrical signals, the image sensor part 300 converts the electrical signals to a subframe. Then, the image sensor part 300 generates a first depth map using the subframe. In addition, the image sensor part 300 extracts a second depth map with a resolution higher than a resolution of the first depth map using a plurality of first depth maps. In this case, the image sensor part 300 stores the first depth maps, wherein the plurality of first depth maps correspond to different optical paths. In this case, the image sensor part 300 uses a super resolution (SR) technology to improve the resolution of the depth map. The image sensor part 300 is a part corresponding to an image sensor which will be described below, and the image sensor part 300 will be described below in detail.

Meanwhile, according to the embodiment of the present invention, in order to extract the second depth map with the resolution higher than the resolution of the first depth map, a pixel shift technology may be used. That is, after several pieces of image data, which are shifted by a distance corresponding to a subpixel, are obtained for each frame using the pixel shift technology, the second depth map with the high resolution may be obtained using the several pieces of image data. In order to shift a pixel, the camera module 10 according to one embodiment of the present invention includes the tilting part 400.

Referring to FIG. 1 again, the tilting part 400 changes at least one optical path of an incident light signal or a reflection light signal in units of subpixels of the image sensor part 300.

The tilting part 400 changes at least one optical path of the incident light signal or the reflection light signal for each image frame. As described above, one image frame may be generated for each integration time. Accordingly, when one integration time is ended, the tilting part 400 changes at least one optical path of the incident light signal or the reflection light signal.

The tilting part 400 changes at least one optical path of the incident light signal or the reflection light signal by a distance corresponding to a subpixel based on the image sensor part 300. In this case, the tilting part 400 changes at least one optical path of the incident light signal or the reflection light signal in any one direction of upward, downward, leftward, and rightward directions based on a present optical path.

Figure 4:
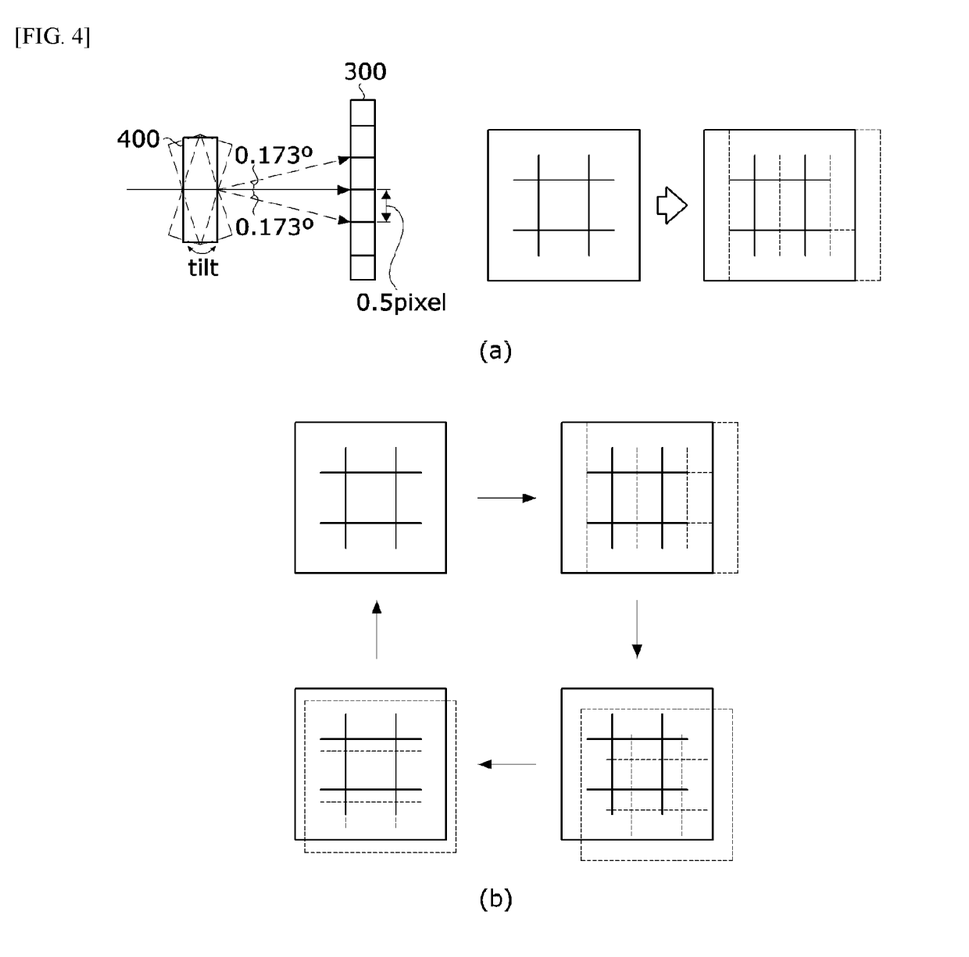
FIG. 4 is a set of views for describing a change in optical path of a reflection light signal by a tilting part.

FIG. 4 is a set of views for describing a change in optical path of a reflection light signal by the tilting part.

In FIG. 4A, a portion illustrated by a solid line shows a present optical path of a reflection light signal and a portion illustrated by a dotted line shows a changed optical path thereof. When an integration time corresponding to the present optical path is ended, the tilting part 400 may change the optical path of the reflection light signal to the optical path illustrated by the dotted line. Then, the path of the reflection light signal is moved from the present optical path by a distance corresponding to the subpixel. For example, as illustrated in FIG. 4A, when the tilting part 400 moves the present optical path rightward by 0.173°, the reflection light signal incident on the image sensor part 300 may be moved rightward by a distance corresponding to 0.5 pixels (subpixel).

According to the embodiment of the present invention, the tilting part 400 may change an optical path of a reflection light signal in the clockwise direction from a reference position. For example, as shown in FIG. 4B, after a first integration time is ended, the tilting part 400 moves an optical path of a reflection light signal rightward by a distance corresponding to 0.5 pixels based on the image sensor part 300 in a second integration time. In addition, the tilting part 400 moves the optical path of the reflection light signal downward by the distance corresponding to 0.5 pixels based on the image sensor part 300 in a third integration time. In addition, the tilting part 400 changes the optical path of the reflection light signal leftward by the distance corresponding to 0.5 pixels based on the image sensor part 300 in a fourth integration time. In addition, the tilting part 400 moves the optical path of the reflection light signal upward by the distance corresponding to 0.5 pixels based on the image sensor part 300 in a fifth integration time. That is, the tilting part 400 can move the optical path of the reflection light signal to the original position in four integration times. This may be similarly applied when an optical path of an incident light signal is moved, and thus the detailed description thereof will be omitted. In addition, the change pattern of the optical path corresponding to the clockwise direction is only exemplary, and the change pattern may correspond to the counterclockwise direction.

Meanwhile, a size of the subpixel may be greater than a size of zero pixels and less than a size of one pixel. For example, the size of the subpixel may have a size of 0.5 pixels, and also have a size of ⅓ pixel. A design of the size of the subpixel may be changed by those skilled in the art.

Hereinafter, the image sensor according to the embodiment of the present invention will be described with reference to FIGS. 5 to 7. The image sensor according to the embodiment of the present invention may be a ToF image sensor and may be a sensor corresponding to the image sensor part 300 of FIG. 1.

Figure 5:
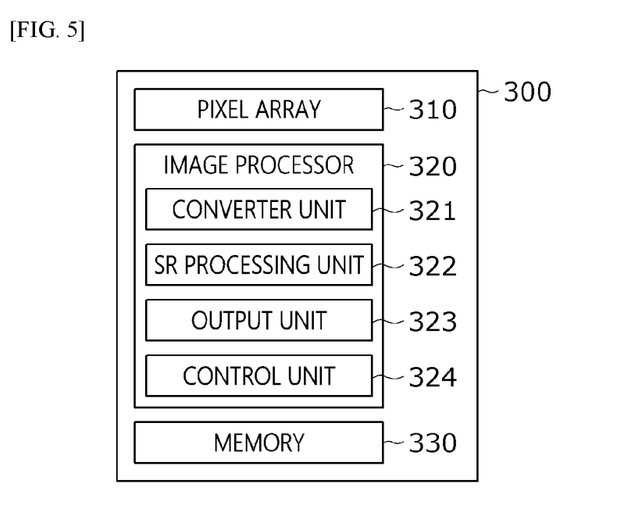
FIG. 5 is a block diagram of an image sensor according to an embodiment of the present invention.

FIG. 5 is a block diagram of the image sensor according to the embodiment of the present invention.

As illustrated in FIG. 5, an image sensor part 300 according to the embodiment of the present invention includes a pixel array 310, an image processor 320, and a memory 330.

First, the pixel array 310 converts a reflection light signal reflected by an object to an electrical signal.

Specifically, the pixel array 310 may be synchronized with a turning on and off cycle of the lighting part 100 of FIG. 1 to receive the reflection light signal. In this case, the pixel array 310 may receive light in phase or out phase of an incident light signal output by the lighting part 100. That is, the pixel array 310 may repeatedly perform an operation of receiving the reflection light signal in a time for which a light source is turned on and an operation of receiving the reflection light signal in a time for which the light source is turned off.

In addition, the pixel array 310 may use a plurality of reference signals having different phase differences to generate electrical signals corresponding to the reference signals. That is, the pixel array 310 changes the reflection light signal to the electrical signal using the plurality of reference signals. A frequency of the reference signal may be set to be the same as a frequency of an incident light signal output by the lighting part 100. Accordingly, in a case in which the lighting part 100 generates incident light signals with a plurality of frequencies, the pixel array 310 uses a plurality of reference signals corresponding to the frequencies to generate electrical signals. The electrical signals may contain information about charge amounts or voltages corresponding to the reference signals.

Figure 6:
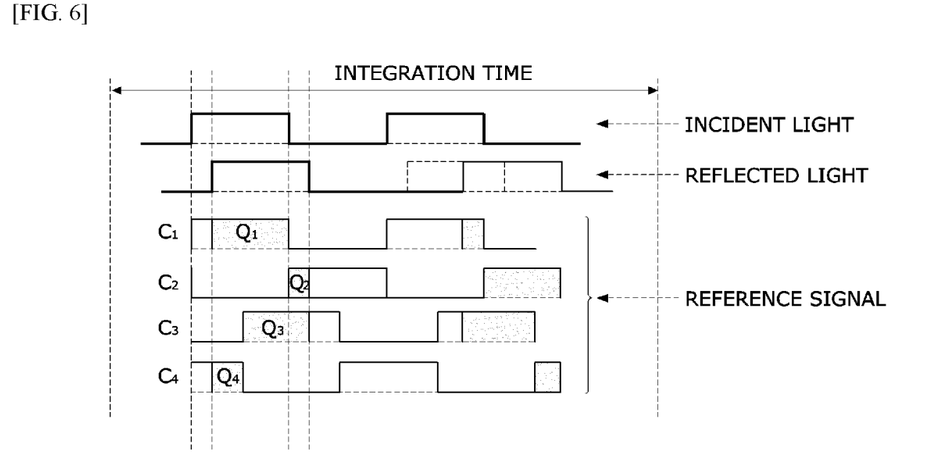
FIG. 6 is a view for describing a process of generating an electrical signal according to an embodiment of the present invention.

FIG. 6 is a view for describing a process of generating an electrical signal according to an embodiment of the present invention.

As shown in FIG. 6, the number of reference signals according to the embodiment of the present invention may be four (reference signals C1 to C4). The reference signals C1 to C4 may have a frequency which is the same as a frequency of an incident light signal and have phase differences of 90° between each other. One reference signal C1 of the four reference signals may have a phase which is the same as a phase of the incident light signal. A phase of a reflection light signal is delayed by a distance in which the incident light signal is incident on an object, is reflected by the object, and is returned. The pixel array 310 mixes the reflection light signal and each of the corresponding reference signals. Then, the pixel array 310 may generate electrical signals corresponding to a shaded region of FIG. 6 for each reference signal.

As another embodiment, during an integration time, in a case in which incident light signals with a plurality of frequencies are generated, the pixel array 310 receives reflection light signals with the plurality of frequencies. For example, it is assumed that incident light signals with frequencies of f1 and f2, and a plurality of reference signals have a phase difference of 90° between each other. Then, since the reflection light signals also have the frequencies of f1 and f2, four electrical signals may be generated due to the reflection light signal with the frequency of f1 and four corresponding reference signals. In addition, four electrical signals may be generated due to the reflection light signal with the frequency of f2 and four corresponding reference signals. Accordingly, a total of eight electrical signals may be generated.

The pixel array 310 may be formed to have a structure in which a plurality of pixels are arrayed in a grid shape. The pixel array 310 may be implemented using a complementary metal oxide semiconductor (CMOS) or charge coupled device (CCD).

Figure 7:
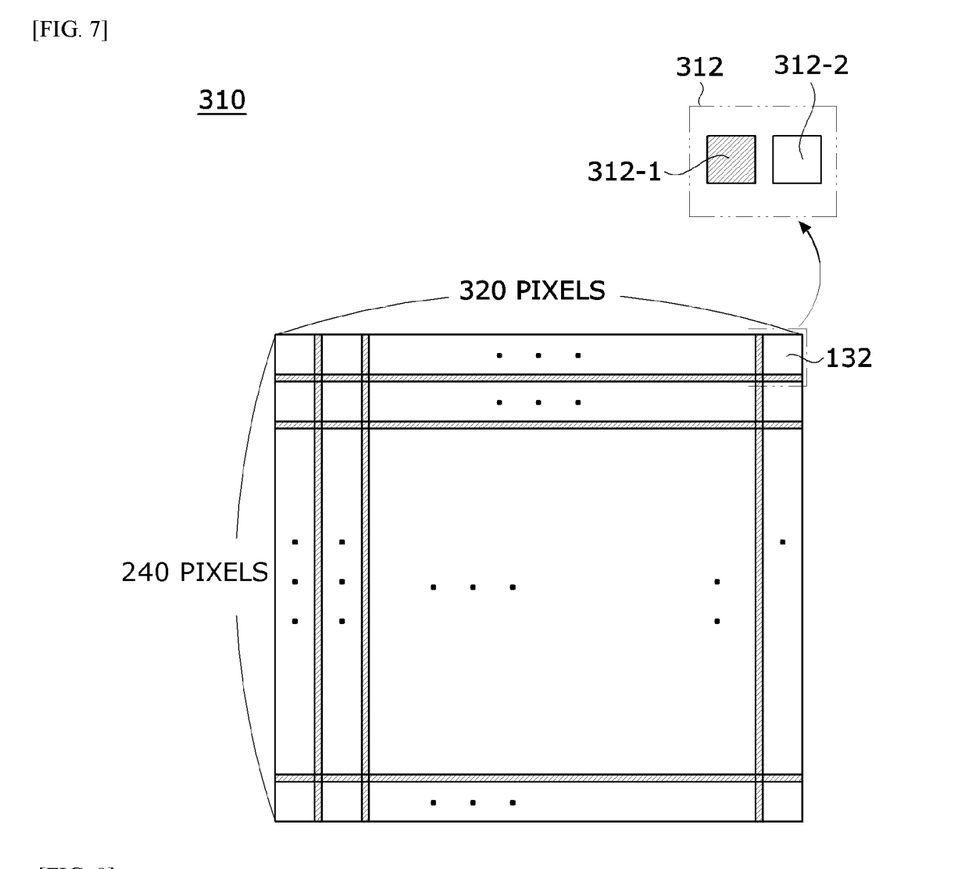
FIG. 7 is a view for describing a structure of a pixel array according to an embodiment of the present invention.

FIG. 7 is a view for describing a structure of a pixel array according to an embodiment of the present invention. For example, in the case of the pixel array 310 with a resolution of 320×240 as shown in FIG. 7, 76,800 pixels are arrayed in the grid shape therein. In this case, predetermined gaps may be generated between the plurality of pixels like shaded regions of FIG. 7. In the present embodiment, a pixel with the predetermined gap adjacent to the pixel will be described as one pixel.

According to the embodiment of the present invention, each of pixels 312 may include a first light receiving part 312-1 having a first photodiode and a first transistor and a second light receiving part 312-2 having a second photodiode and a second transistor.

The first light receiving part 312-1 receives a reflection light signal with a phase which is the same as a phase of a waveform of incident light. That is, at a time at which a light source is turned on, the first photodiode is turned on and receives a reflection light signal. In addition, at a time at which the light source is turned off, the first photodiode is turned off and stops receiving reflection light. The first photodiode converts the received reflection light signal to a current and transmits the current to the first transistor. The first transistor converts the received current to an electrical signal and outputs the electrical signal.

The second light receiving part 312-2 receives the reflection light signal with a phase opposite to the phase of the waveform of the incident light. That is, at the time at which the light source is turned on, the second photodiode is turned off and receives the reflection light signal. In addition, at the time at which the light source is turned off, the second photodiode is turned on and stops receiving the reflection light. The second photodiode converts the received reflection light signal to a current and transmits the current to the second transistor. The second transistor converts the received current to an electrical signal.

Accordingly, the first light receiving part 312-1 may be referred to as an in phase receiving unit, and the second light receiving part 312-2 may be referred as an out phase receiving unit. As described above, when the first light receiving part 312-1 and the second light receiving part 312-2 are activated at different times, a difference in amount of received light is generated according to a distance from the object. For example, in a case in which an object is right in front of the camera module 10 (that is, a distance=0), since a time taken for light to be output by the lighting part 100, reflected by the object, and returned is zero, a turning on and off cycle of the light source is a light receiving cycle. Accordingly, only the first light receiving part 312-1 receives the light, and the second light receiving part 312-2 does not receive the light. As another example, in a case in which an object is spaced apart from the camera module 10 by a predetermined distance, since it takes time for light to be output by the lighting part 100, reflected by the object, and returned, a turning on and off cycle of the light source is different from a light receiving cycle. Accordingly, a difference in amount of received light is generated between the first light receiving part 312-1 and the second light receiving part 312-2. That is, a distance from the object may be calculated using the difference in amount of received light between the first light receiving part 312-1 and the second light receiving part 312-2.

Referring to FIG. 5 again, the image processor 320 converts electrical signals to generate a subframe and uses a plurality of subframes to extract a depth map with a resolution higher than a resolution of the subframe. In order to perform such a function, the image processor 320 includes a converter unit 321, an SR processing unit 322, an output unit 323, and a control unit 324.

The converter unit 321 converts electrical signals received from the pixel array 310 to generate a subframe. That is, the converter unit 321 may convert the electrical signals which are analog signals to the subframe formed as digital signals. In this case, the subframe may mean image data generated from electrical signals corresponding to any one of integration time and reference signals. For example, in a case in which electrical signals are generated using eight reference signals in a first integration time, that is, one image frame, eight first depth maps may be generated and one start of frame may be further generated.

In addition, the converter unit 321 performs a depth calculation on the subframe to extract the first depth map. In this case, a resolution of the first depth map may be the same as a resolution of the subframe.

Specifically, the converter unit 321 uses electrical signals to calculate a phase difference between incident light and reflection light and uses the phase difference to calculate a distance between an object and the camera module 10.

The converter unit 321 may use charge amount information of the electrical signals to calculate a phase difference between the incident light and the reflection light.

As described above, four electrical signals may be generated for each frequency of an incident light signal. Accordingly, the converter unit 321 may calculate a phase difference td between the incident light signal and the reflection light signal using the following Equation 1.

$$t_d = \arctan\left(\frac{Q_3 - Q_4}{Q_1 - Q_2}\right) \quad \text{[Equation 1]}$$

Here, Q1 to Q4 are amounts of charges of four electrical signals. Q1 is the amount of charges of the electrical signal corresponding to a reference signal with a phase which is the same as a phase of the incident light signal. Q2 is the amount of charges of the electrical signal corresponding to a reference signal with a phase delayed by 180° from the phase of the incident light signal. Q3 is the amount of charges of the electrical signal corresponding to a reference signal with a phase delayed by 90° from the phase of the incident light signal. Q4 is the amount of charges of the electrical signal corresponding to a reference signal with a phase delayed by 270° from the phase of the incident light signal.

Then, the converter unit 321 may calculate a distance between an object and the camera module 10 using the phase difference between the incident light signal and the reflection light signal. In this case, the converter unit 321 may calculate a distance d between the object and the camera module 10 using the following Equation 2.

$$d = \frac{c}{2f} \frac{t_d}{2\pi}$$ [Equation 2]

Here, c is a light speed, and f is a frequency of incident light.

That is, the converter unit 321 generates a first depth map using a result value of the calculated distance d between the object and the camera module 10 for each pixel.

Next, the SR processing unit 322 extracts a second depth map with a resolution higher than a resolution of the first depth map using a plurality of first depth maps stored in the memory 330. Specifically, when the SR processing unit 322 receives the plurality of first depth maps stored in the memory 330, the SR processing unit 322 applies a SR technology to the received plurality of first depth maps to extract a depth map.

The SR technology is a technology for obtaining a high resolution image from a plurality of low resolution images, and a mathematical model of the SR technology may be expressed as Equation 3.

$$y_k = D_k B_k M_k x + n_k$$ [Equation 3]

Here, l=k≤p, p is the number of low resolution images, $y_k$ is a low resolution image (=$[y_{k,1}, y_{k,2}, \text{to } y_{k,M}]^T$, here, M=N1*N2), $D_k$ is a down sampling matrix, $B_k$ is an optical blur matrix, $M_k$ is an image warping matrix, x is a high resolution image (=$[x_1, x_2, \text{to } x_N]^T$, here, N=L1N1*L2N2), and $n_k$ is noise. That is, according to the SR technology, an inverse function of estimated resolution degradation factors is applied to $y_k$ to estimate x. The SR technology may be mainly divided into a statistical method and a multi-frame method, and the multi-frame method may be mainly divided into a space division method and a time division method. However, in a case in which the SR technology is used for a depth map, since an inverse function of $M_k$ of Equation 3 is not present, the statistical method may be tried. However, in the case of the statistical method, since a repeated calculation process is needed, there is a problem of low efficiency. According to the embodiment of the present invention, since the plurality of first depth maps are an image captured after changing optical paths in units of subpixels of the pixel array 310, an inverse function of the image warping matrix may be known even without using the statistical method. Accordingly, there is an advantage of improving efficiency of the SR technology.

Figure 8:
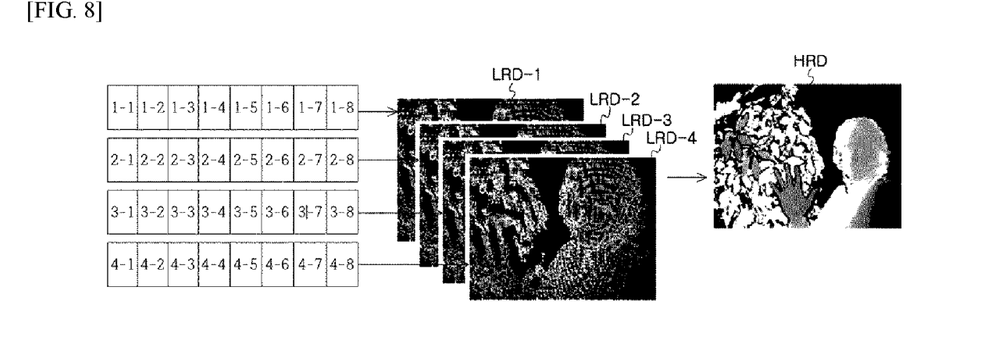
FIG. 8 is a view for describing a super resolution (SR) technology according to an embodiment of the present invention.

FIG. 8 is a view for describing a SR technology according to an embodiment of the present invention.

Referring to FIG. 8, the converter unit 321 may extract a first depth map using a plurality of subframes generated in one integration time, that is, one frame. In addition, the converter unit 321 may extract a second depth map by applying the SR technology to first depth maps of different frames.

For example, the converter unit 321 may generate subframes 1-1 to 4-8 using a plurality of electrical signals. Specifically, the subframes 1-1 to 1-8 are subframes generated in a first integration time. The subframes 2-1 to 2-8 are subframes generated in a second integration time. The subframes 3-1 to 3-8 are subframes generated in a third integration time. The subframes 4-1 to 4-8 are subframes generated in a fourth integration time. Then, the converter unit 321 applies a depth map extraction technology to the plurality of subframes generated in each of the integration times to extract a first depth maps LRD-1 to LRD-4. Specifically, the first depth map LRD-1 is extracted by applying the depth map extraction technology, that is, a depth calculation, to the subframes 1-1 to 1-8. The first depth map LRD-2 is extracted by applying the depth calculation to the subframes 2-1 to 2-8. The first depth map LRD-3 is extracted by applying the depth calculation to the subframes 3-1 to 3-8. The first depth map LRD-4 is extracted by applying the depth calculation to the subframes 4-1 to 4-8. Then, the SR processing unit 322 extracts a second depth map HRD by applying the SR technology to the first depth maps LRD-1 to LRD-4. In the case of FIG. 8, the second depth map may have a resolution higher than four times a resolution of the first depth map.

The output unit 323 outputs the second depth map, and the control unit 324 controls input and output of the first and second depth maps. Specifically, when the converter unit 321 extracts the first depth maps, the control unit 324 transmits the extracted first depth maps to the memory 330. In addition, when the memory 330 stores the first depth maps, the control unit 324 controls the plurality of first depth maps stored in the memory 330 to be transmitted to the SR processing unit 322. When the SR processing unit 322 extracts the second depth map, the control unit 324 transmits the second depth map to the output unit 323.

Referring to FIG. 5 again, the memory 330 stores the first depth maps, wherein the memory 330 stores the plurality of first depth maps corresponding to different optical paths. When the memory 330 receives the first depth maps from the image processor 320, the memory 330 deletes, among first depth maps prestored therein, the first depth maps corresponding to optical paths which are the same as optical paths of the first depth maps received from image processor 320, and the memory 330 stores the first depth maps received from the image processor 320. In addition, the memory 330 may transmit a signal to notify the image processor 320 of storing of the received first depth maps, and when the image processor 320 receives the corresponding signal, the image processor 320 may receive the plurality of first depth maps stored in the memory 330 to extract the second depth map.

Figure 9:
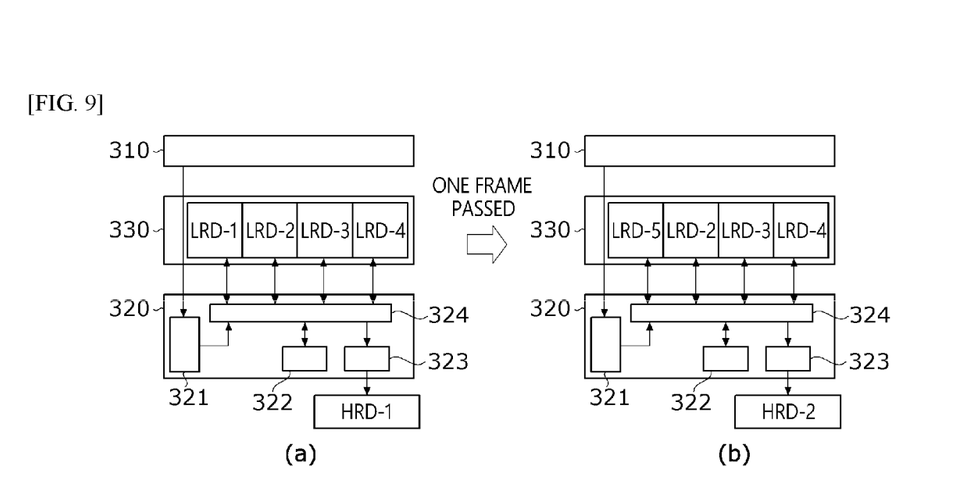
FIGS. 9 and 10 are sets of views for describing a data flow of the image sensor according to the embodiment of the present invention.
Figure 10:
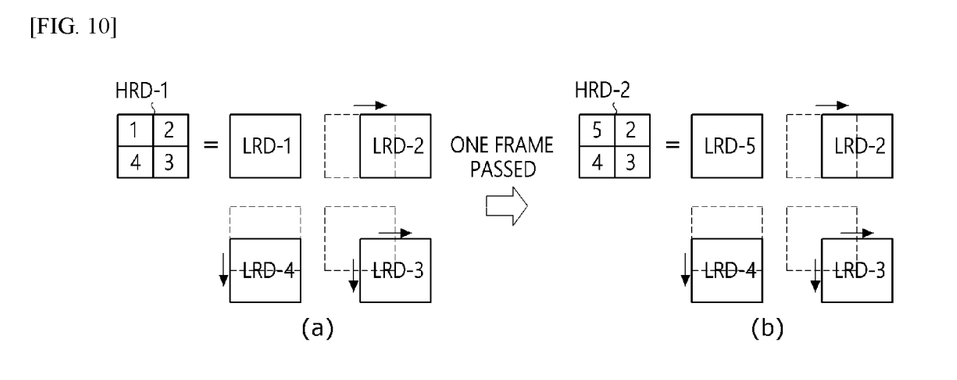

FIGS. 9 and 10 are sets of views for describing a data flow of the image sensor according to the embodiment of the present invention. In this case, the data contains information of an electrical signal, a subframe, a first depth map, and a second depth map.

First, referring to FIG. 9A, the pixel array 310 receives reflection light signals to generate electrical signals and transmits the electrical signals to the converter unit 321 of the image processor 320. Then, the converter unit 321 extracts first depth maps using the electrical signals, and the control unit 324 transmits the first depth maps to the memory 330. The memory 330 stores the received first depth maps. The memory 330 stores the plurality of first depth maps corresponding to different optical paths, wherein the plurality of first depth maps are generated through the different optical paths. For example, as shown in FIG. 10A, in a case in which the first depth maps are generated to correspond to four different optical paths, the memory 330 stores four first depth maps. In a case in which first depth maps are generated to correspond to nine different optical paths, the memory 330 may store nine first depth maps. That is, when the number of optical paths shifted in units of subpixels of the pixel array 310 is N×M, the memory 330 stores N×M first depth maps. Here, N and M are integers. When the memory 330 stores the first depth maps, the SR processing unit 322 receives all of the first depth maps stored in the memory 330 through the control unit 324 and applies the SR technology thereto to extract a second depth map. That is, as shown in FIGS. 9A and 10A, the SR processing unit 322 receives first depth maps LRD-1 to LRD-4 and applies the SR technology thereto to extract a second depth map HRD-1. The extracted second depth map HRD-1 is transmitted to the output unit 323 through the control unit 324, and the output unit 323 outputs the second depth map HRD-1.

In FIGS. 9A and 10A, when one frame is passed, the pixel array 310 receives reflection light signals to generate electrical signals and transmits the electrical signals to the converter unit 321 of the image processor 320. Then, the converter unit 321 extracts a first depth map LRD-5 using the electrical signals, and the control unit 324 transmits the first depth map LRD-5 to the memory 330. In this case, as shown in FIGS. 10A and 10B, optical paths of the first depth map LRD-5 are the same as optical paths of the first depth map LRD-1. Accordingly, the memory 330 deletes the first depth map LRD-1 and stores the received first depth map LRD-5. When the memory 330 stores the first depth map LRD-5, the SR processing unit 322 receives all of the first depth maps LRD-2 to LRD-5 stored in the memory 330 through the control unit 324 and applies the SR technology thereto to extract a second depth map HRD-2. The extracted second depth map HRD-2 is transmitted to the output unit 323 through the control unit 324, and the output unit 323 outputs the second depth map HRD-2.

Figure 11:
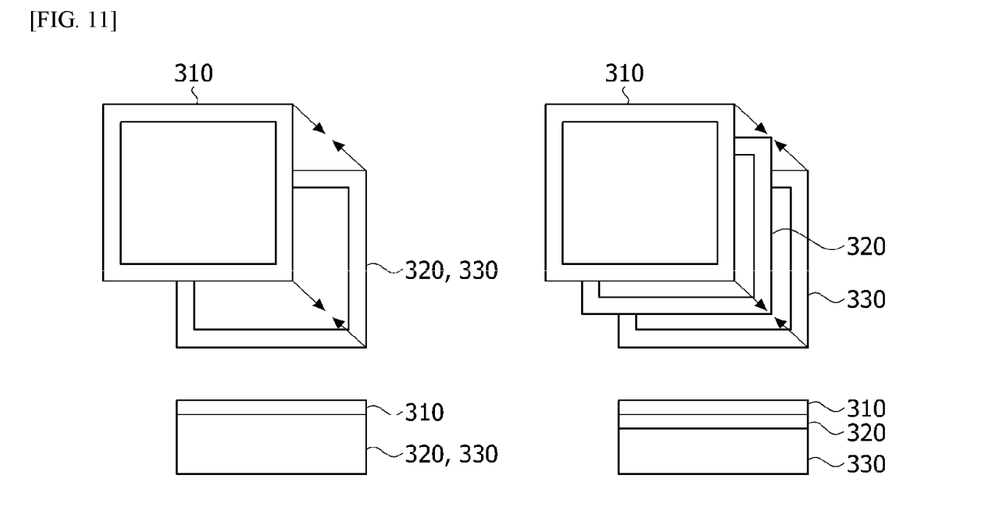
FIG. 11 is a view for describing a structure of the image sensor according to the embodiment of the present invention.

FIG. 11 is a view for describing a structure of the image sensor according to the embodiment of the present invention.

First, as illustrated in FIG. 11A, in the image sensor part 300, the pixel array 310 and the image processor 320 may be implemented as layer types. Specifically, the pixel array 310 may be implemented as the layer type in which photoelectric elements, such as a CCD or CMOS, are arrayed in a grid shape. In addition, the image processor 320 may be implemented as the layer type such as a printed circuit board (PCB). The pixel array 310 is stacked on an upper end of the image processor 320. In this case, the memory 330 may be included in the layer in which the image processor 320 is formed. For example, a predetermined space may be assigned on the PCB on which the image processor 320 is formed, and the memory 330 may be formed therein.

Next, as illustrated in FIG. 11B, in the image sensor part 300, each of the pixel array 310, the image processor 320, and the memory 330 may be formed as a layer type. The memory 330 is stacked on an upper end of the image processor 320 implemented as the layer type. In addition, the pixel array 310 is stacked on an upper end of the memory 330.

Figure 12:
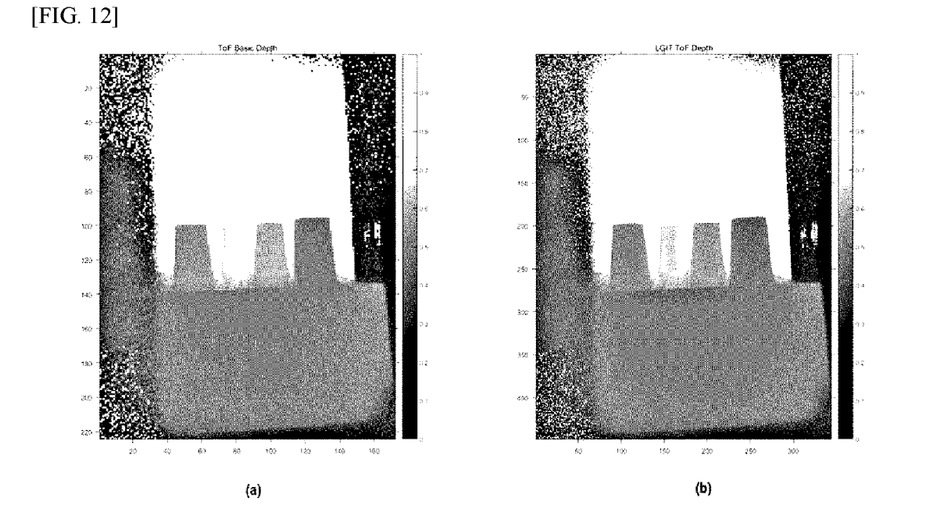
FIG. 12 is a set of views in which an image with a second depth obtained by the image sensor according to the embodiment of the present invention is compared with an image with a conventional depth.

FIG. 12 is a set of views in which an image with a second depth obtained by the image sensor according to the embodiment of the present invention is compared with an image with a conventional depth.

FIG. 12A is an image with a depth map obtained by the conventional image sensor with a resolution of 172×224. FIG. 12B is an image with a depth map obtained by the image sensor according to the embodiment of the present invention. A pixel array including 172×224 pixels was used in each of the conventional image sensor of FIG. 12A and the image sensor of the FIG. 12B according to the embodiment of the present invention. However, it was seen that, in FIG. 12A, the depth map with the resolution of 172×224 was output, and in FIG. 12B, the depth map with a resolution of 344×448 was output which was increased by four times the resolution of FIG. 12A. In addition, when FIGS. 12A and 12B were compared, it was seen that aliasing of a line which was a border of an object was significantly reduced in FIG. 12A. That is, it was seen that image quality of the depth map was significantly improved in addition to a simple increase in number of pixels of the depth map.

While the present invention has been mainly described above with reference to the embodiments, it will be understood by those skilled in the art that the invention is not limited to the embodiments, the embodiments are only examples, and various modifications and applications which are not illustrated above may fall within the range of the present invention without departing from the essential features of the present embodiments. For example, components specifically described in the embodiments may be modified and implemented. In addition, it should be interpreted that differences related to modifications and applications fall within the scope of the present invention defined by the appended claims.

The invention claimed is:

1. An image sensor comprising:
a pixel array in which a plurality of pixels are arrayed in a grid shape and which converts reflection light signals reflected by an object to electrical signals;
an image processor configured to convert the electrical signals to generate subframes and extract a second depth map with a resolution higher than a resolution of first depth maps extracted from the plurality of subframes; and
a memory configured to store the first depth maps,
wherein the reflection light signals are input into the pixel array through different optical paths shifted in units of subpixels of the pixel array,
wherein, the memory stores the plurality of first depth maps corresponding to the different optical paths, and
wherein, when the memory receives the first depth maps from the image processor, the memory is configured to:
delete, among first depth maps prestored therein, a first depth map corresponding to an optical path which is the same as the optical path of the first depth map received from the image processor; and
store the first depth maps received from the image processor.

2. The image sensor of claim 1, wherein the image processor includes:
a converter unit configured to convert the electrical signals received from the pixel array to generate the subframes and configured to apply depth calculation to the subframes to extract the first depth maps;
a super resolution (SR) processing unit configured to extract the second depth map using the plurality of first depth maps stored in the memory;
an output unit configured to output the second depth map; and
a control unit configured to control input and output of the first and second depth maps, and
wherein, when the memory stores the first depth maps, the control unit controls the plurality of first depth maps stored in the memory to be transmitted to the SR processing unit.

3. The image sensor of claim 2, wherein, when the SR processing unit receives the plurality of first depth maps stored in the memory, the SR processing unit extracts the second depth map by applying an SR technology to the received plurality of subframes.

4. The image sensor of claim 1, wherein:
each of the pixel array, the image processor, and the memory is formed as a layer type, and
the memory is stacked between the pixel array and the image processor.

5. The image sensor of claim 1, wherein:
each of the pixel array and the image processor is formed as a layer type,
the pixel array is stacked on the image processor, and
the memory is included in a layer in which the image processor is formed.

6. The image sensor of claim 1, wherein:
the number of optical paths shifted in units of subpixels of the pixel array is N×M, wherein N and M are integers greater than zero, and
the memory stores the N×M first depth maps.

7. The image sensor of claim 1, wherein each pixel of the pixel array has a first light receiving part and a second light receiving part.

8. A camera module comprising:
a lighting part configured to output an incident light signal to be emitted to an object;
a lens part configured to collect reflection light signals reflected by the object;
an image sensor part configured to extract a depth map using the reflection light signals collected by the lens part; and
a tilting part configured to shift at least one optical path of the incident light signal or the reflection light signal in units of subpixels of the image sensor part for each image frame,
wherein the image sensor part includes a pixel array in which a plurality of pixels are arrayed in a grid shape and which converts the reflection light signals reflected by the object to electrical signals, an image processor configured to convert the electrical signals to generate subframes and extract a depth map with a resolution higher than a resolution of the subframes using the plurality of subframes, and a memory configured to store the subframes,
wherein the reflection light signals are input into the pixel array through different optical paths shifted in units of subpixels of the pixel array,
wherein the memory stores the plurality of subframes corresponding to the different optical paths, and
wherein, when the memory receives first depth maps from the image processor, the memory is configured to:
delete, among first depth maps prestored therein, a first depth map corresponding to an optical path which is the same as an optical path of the first depth map received from the image processor; and
store the first depth map received from the image processor.

9. The camera module of claim 8, wherein:
when the memory stores the first depth maps, the image processor transmits the plurality of first depth maps stored in the memory to a super resolution (SR) processing unit, and
when the image processor receives the plurality of first depth maps stored in the memory, the image processor extracts the second depth map by applying an SR technology to the received plurality of subframes.

10. The camera module of claim 8, wherein the image processor includes:
a converter unit configured to convert the electrical signals received from the pixel array to generate the subframes and configured to apply depth calculation to the subframes to extract the first depth maps;
a super resolution (SR) processing unit configured to extract the second depth map using the plurality of first depth maps stored in the memory;
an output unit configured to output the second depth map; and
a control unit configured to control input and output of the first and second depth maps, and
wherein, when the memory stores the first depth maps, the control unit controls the plurality of first depth maps stored in the memory to be transmitted to the SR processing unit.

11. The camera module of claim 10, wherein, when the SR processing unit receives the plurality of first depth maps stored in the memory, the SR processing unit extracts the second depth map by applying an SR technology to the received plurality of subframes.

12. The camera module of claim 8, wherein:
each of the pixel array, the image processor, and the memory is formed as a layer type, and
the memory is stacked between the pixel array and the image processor.

13. The camera module of claim 8, wherein:
each of the pixel array and the image processor is formed as a layer type,
the pixel array is stacked on the image processor, and
the memory is included in a layer in which the image processor is formed.

14. The camera module of claim 8, wherein:
the number of optical paths shifted in units of subpixels of the pixel array is N×M, wherein N and M are integers greater than zero, and
the memory stores the N×M first depth maps.

15. The camera module of claim 8, wherein each pixel of the pixel array has a first light receiving part and a second light receiving part.

* * * * *